Figure 1:
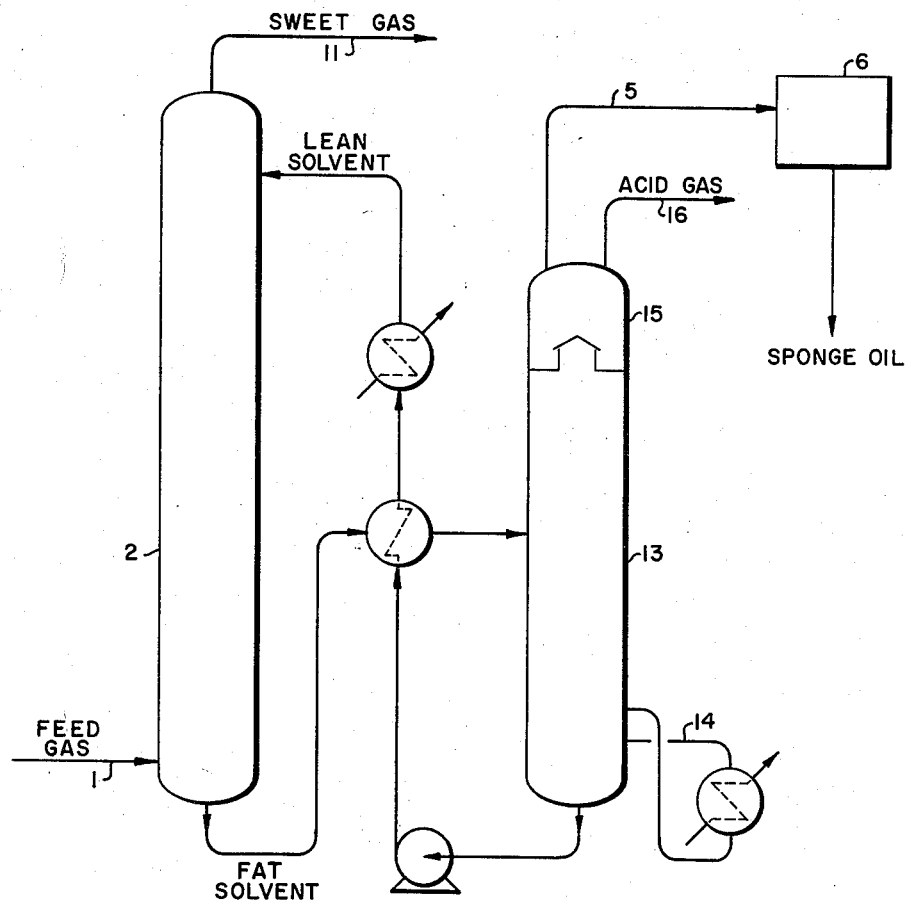

INVENTORS:
CARL H. DEAL, JR
ELWOOD L. DERR
MICHAEL N. PAPADOPOULOS
BY: *William H. Myers*
THEIR AGENT Dec. 15, 1964   C. H. DEAL, JR., ETAL   3,161,461
METHOD OF REMOVING ACIDIC GASES FROM GASEOUS MIXTURES
Filed Dec. 23, 1960   2 Sheets-Sheet 2

INVENTORS:
CARL H. DEAL, JR.
ELWOOD L. DERR
MICHAEL N. PAPADOPOULOS
BY: William H. Myers
THEIR AGENT

3,161,461
METHOD OF REMOVING ACIDIC GASES FROM GASEOUS MIXTURES
Carl H. Deal, Jr., Orinda, and Elwood L. Derr and Michael N. Papadopoulos, Walnut Creek, Calif., assignors to Shell Oil Company, New York, N.Y., a corporation of Delaware
Filed Dec. 23, 1960, Ser. No. 78,162
5 Claims. (Cl. 23—3)

This invention relates to the separation of acidic sulfur-containing gases from gaseous mixtures. More particularly, this invention relates to the separation of sulfur-containing acidic gases from gas mixtures by means of a selective absorbent.

A number of methods have previously been proposed for the removal of acid gases from mixtures of gases contaminated with such materials as hydrogen sulfide, carbonyl sulfide, carbon dioxide and the like. Some of these methods usually involve the formation of salts of the acid gases, the salts being subsequently decomposed usually by heating to regenerate the solution utilized as an absorbent and to drive off the gas absorbed.

In many cases aqueous solutions of alkanolamines and the like are utilized. Such solutions have relatively limited solubility for acid gases. This results in a necessity for recycling and treating unduly large quantities of such solutions. It also results in undue corrosion of processing equipment caused particularly by the presence of sulfur-containing compounds and water. One of the most important disadvantages of the use of such solutions is the limited solubility for the acid gases when the latter are under a high partial pressure. This results in only fractional removal of the acid gas from its admixture with hydrocarbons or other gaseous materials.

Contrasted to the use of so-called "chemical solvents," involving the formation of salts or other decomposable reaction products, certain classes of materials are regarded as "physical solvents." These include such materials as glycols which appear to act in a purely physical manner, absorbing acidic gases physically without the formation of any apparent reaction product. Mixtures of glycols with amines are known, particularly for the treatment of liquid hydrocarbon products or the removal of mercaptans, $H_2S$ and other acidic substances. However, glycols have not been found to be very efficient due to the limited solubility of acidic gases therein. Aqueous dispersions of glycols are no better in this respect and, moreover, exhibit extreme corrosiveness toward processing equipment.

One of the problems encountered, especially in the processing of gases initially having high partial pressure of acid components, is efficient removal of the entire acid component content both at the time the gas contains relatively highly partial pressure of acid gas and after removal of the major proportion, the removal of the remainder of the acid gases where the latter have only a relatively low partial pressure. None of the known absorbents are efficient in both respects.

Another disadvantage of the use of aqueous solutions is the necessity for a separate dehydration step, since such absorbents do not selectively remove water at the same time they absorb acidic gases such as hydrogen sulfide. Since water cannot be tolerated in many instances in the sweet gas stream, this constitutes an additional cost factor in the processing of gases containing appreciable amounts of water.

It is an object of the present invention to overcome disadvantages inherent in the use of previously known absorbents. It is a particular object of the invention to provide a process for the removal of acidic gases over a wide range of partial pressures thereof. It is a particular object of the invention to provide a new and improved process combining the advantages of both chemical absorbents and physical absorbents. Other objects will become apparent during the following detailed description of the invention.

Now, in accordance with the present invention, a process has been found for the separation and recovery of acidic gases from mixtures containing the same wherein efficient recovery is obtained both under high and low partial pressures. The process of the invention comprises contacting the gas mixture with a liquid absorbent comprising 7.5–70% by weight of an amine having a $pK_b$ at 25° C. of 3–15 and 30–92.5% by weight of a selective physical solvent of the group consisting of an aliphatic acid amide, perhalocarbons, cyclotetramethylene sulfones and mixtures thereof.

Figure 3:
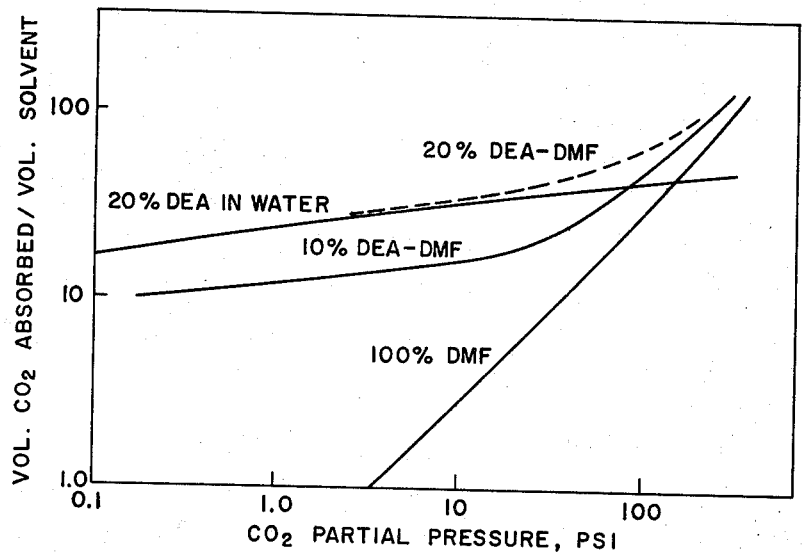
Figure 2:
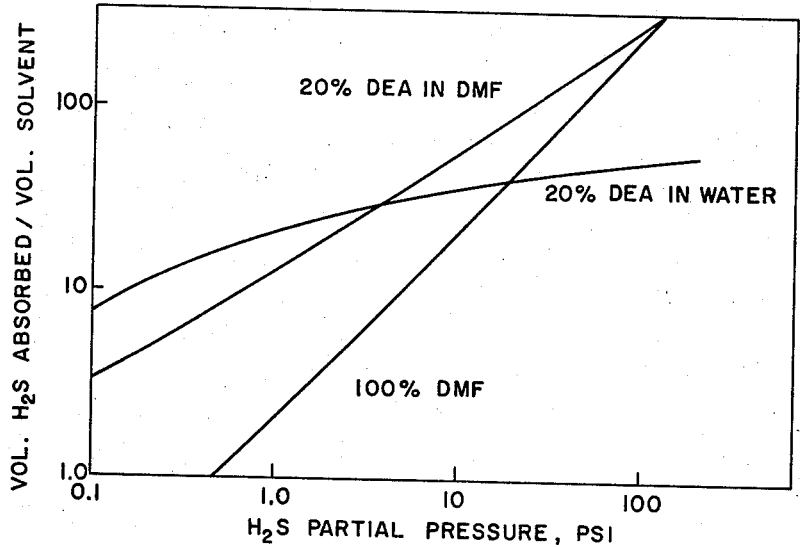

FIGURE 1 shows an arrangement of apparatus suitable for carrying out the basic invention. FIGURE 2 shows relative solvencies of liquid absorbents of this invention for $H_2S$ compared with prior art absorbents. FIGURE 3 is a similar graph showing relative solvencies of carbon dioxide in absorbents of this invention and in prior art absorbents.

The principal attainment of the process of this invention is the high degree of removal of acidic gas components from gaseous mixtures containing progressively smaller amounts of acidic gas. For example, when a gaseous mixture enters the lower part of an absorption column countercurrent to a descending stream of liquid absorbent the most efficient operation is obtained by use of the absorption composition of this inventive process, since a high degree of absorption is obtained under the relatively high partial pressure of acidic gases where contact is initially made. This high rate of absorption is maintained even as the partial pressure of acidic gas progressively decreases as the scrubbed gas mixture proceeds upward in the column.

In accordance with one version of the invention, the acid gases may be contaminated with higher boiling hydrocarbons in the gasoline range such as is often the case with natural gas. In such case, the acid gases are passed through a sponge oil comprising gas oil hydrocarbons ($C_{12-18}$ hydrocarbons) wherein the gasoline components are absorbed in the sponge oil, the acid gases passing to a utilization destination.

In still another aspect of the present invention, hydrogen sulfide absorbed in the liquid absorbent may be utilized in situ by injection of sulfur dioxide into the absorption column for the purpose of reaction with absorbed hydrogen sulfide to form elemental sulfur, the remaining aspects of the invention as recited above being essentially the same. This aspect of the invention is based upon the unexpected finding that liquid absorbents comprising a substantial proportion of aliphatic acid amides or cyclotetramethylene sulfones in admixture with amines constitute surprisingly satisfactory media in which to form elemental sulfur by such a reaction.

While alkanolamines such as ethanolamine, diethanolamine, methylethanolamine are a preferred sub-generic class, other amines may be utilized, including alkylamines, phenylalkylamines, phenylenediamines, alkoxyalkylamines and alkoxyanylamines. Typical species suitable for the present process include dimethylamine, methylethylamine, phenylethylamine, 2,4-phenylenediamine, and methoxyethylamine.

The "physical solvent" portion of the liquid absorbent composition with which amines are combined may comprise aliphatic acid amides or cyclotetramethylene sulfones, perhalocarbons or mixtures thereof.

Specific amides which may be utilized in the process of this invention are preferably the dialkyl N-substituted aliphatic acid amides. The prefererd species is dimethyl formamide, other species being those in which the alkyl groups directly attached to nitrogen have from 1 to 4 carbon atoms each and the acid being one having from 1 to 4 carbon atoms per molecule. These include dimethyl formamide, methylethyl formamide, diethyl formamide, propylmethyl formamide and dibutyl formamide. Other species include dimethylacetamide, methylethyl acetamide and dimethyl propamide. Additional amides include formamide, acetamide, propamide and butamide. Mixtures of the amides may be utilized if desired.

Suitable perhalocarbons include perfluoroalkanes such as perfluoroethane and perfluorobutane, as well as perchloralkanes such as perchloropropane.

Preferably physical solvents are utilized which exhibit an increase in activity coefficient of 1.1–1.5 per carbon number.

The sulfones which comprise compounds utilized in the process of this invention are based upon cyclotetramethylene sulfone, the basic and prefered species being sulfolane, otherwise referred to as thiophene tetrahydro-1,1-dioxide. Suitable derivatives of the basic compound include 2,3-dimethyl tetramethylene sulfone; 2,4-dimethyl tetramethylene sulfone; 2,5-dimethyl cyclotetramethylene sulfone; 3-ethyl cyclotetramethylene sulfone; 2-methyl 5-propyl cyclotetramethylene sulfone as well as their analogues. It is preferred that the number of alkyl radicals not exceed 4 and still more preferably that no more than 2 alkyl substituents are appended to the tetramethylene sulfone ring.

The effectiveness of the present invention relies upon the use of an absorbent mixture comprising 30–92.5% by weight of one or more of the "physical solvents" and 7.5–70% by weight of an amine. Preferably, the mixed absorbent comprises 10–30% by weight of a dialkanol amine and 90–70% by weight of a sulfone. Optimum results are moreover obtained when the absorption is conducted under pressures of 150–500 p.s.i.a. and at temperatures between about 40° F. to about 350° F.

In still another aspect of the present invention, sulfur dioxide is injected into the absorption column for the purpose of reaction with absorbed hydrogen sulfide to form elemental sulfur, the remaining aspects of the invention as recited above being essentially the same. This aspect of the invention is based upon the unexpected finding that the solvent mixtures of the invention constitute surprisingly amenable media in which to form elemental sulfur by such a reaction. In this medium, the sulfur forms a relatively heavy precipitate which rapidly settles from the main bulk of the liquid solvent mixture and is easily separated therefrom by decantation or centrifuging. Contrasted to this, formation of elemental sulfur in many other media, results in the preparation of an extremely finely divided milky precipitate which tends to cling to the walls and component parts of treating equipment.

The gas mixtures to be treated in accordance with this invention may include flue gas, refinery gas or natural gas. The particular advantage of the combined absorbent utilized in accordance with this invention is the high efficiency of absorption under a wide range of partial pressures of acid gases. The latter may include hydrogen sulfide, sulfur dioxide, carbonyl sulfide and/or carbon dioxide. A typical natural gas of high acid gas content which may be treated according to the process of this invention has the following composition.

| Component: | Volume percent |
|---|---|
| Hydrogen sulfide | 31.48 |
| Carbon dioxide | 7.10 |
| Nitrogen | 4.52 |
| Methane | 50.35 |
| Ethane | 2.16 |
| Propane | 0.74 |
| Isobutane | 0.23 |
| Normal butane | 0.41 |
| Isopentane | 0.31 |
| Normal pentane | 0.39 |
| Hexanes | 0.53 |
| Heptanes and higher | 1.78 |

While the process of the invention may be utilized for the extraction of such highly acid gases as that exemplified above, it also may be employed for the treatment of gases wherein the acid gas content is relatively low such as the refinery gas having the following typical composition.

| Component: | Volume percent |
|---|---|
| Hydrogen sulfide | 7.5 |
| Carbon dioxide | 1.3 |
| Nitrogen | 23.0 |
| Hydrogen | 20.1 |
| Methane | 43.0 |
| Ethane | 3.3 |
| Propane | 0.8 |
| Isobutane | 0.3 |
| Normal butane | 0.2 |
| Pentanes and higher | 0.5 |

The basic step in the process of the invention comprises intimate contacting between the gaseous mixture and the liquid absorbent mixture under pressures as outlined above. Countercurrent contacting is preferred in the absorption column, although this engineering detail may be varied according to specific plant design. A highly preferred aspect of the operation of the absorption column is to conduct absorption under rectified absorber conditions wherein the bottom of the absorption tower has a temperature between about 50 and about 150° F. higher than the temperature in the top part of the absorption zone. Normally, intimate contacting is effected in a vertically positioned tower, the sweet dry gas exiting from the tower near or at the top thereof while the fat absorbent solution (containing extracted acidic gases) leaves at or near the bottom of the tower. Heat may be supplied if necessary by means such as a steam coil or reboiler near the bottom of the tower. The latter is preferably supplied with fractionating plates, baffles or other contacting means.

The "fat" absorbent solution contains dissolved therein acid gases such as hydrogen sulfide and the like together with possible contaminating proportions of hydrocarbons originally present in the gaseous mixture. Under the preferred rectified absorption conditions, the proportion of hydrocarbon contaminant to hydrogen sulfide is maintained at a minimum level, the maximum ratio of hydrocarbon to hydrogen sulfide or other acid gas being about 5 to 100 parts by weight. In the absence of rectification, the proportion of hydrocarbon contaminant which may occure in the fat absorbent solution is much greater, the proportion of hydrocarbon often exceeding the amount of hydrogen sulfide present. This is of particular disadvantage when the hydrogen sulfide is to be utilized subsequently for the preparation of elemental sulfur or for other known utilization purposes.

The fat absorbent solution is conducted from the bottom portion of the absorption tower, leaving under high pipeline pressure to a flashing zone wherein pressure is reduced to 2–100 p.s.i.a. for the purpose of removing a major portion of the acid gas. In the same or a subsequent tower, referred to as a gas stripper, the remaining solution is heated to a temperature sufficient to volatilize the acid gases and water therefrom, both of which exit at various ports near the top of the stripping tower.

In accordance with one feature of the present invention any remaining gasoline type hydrocarbons (hereinafter referred to as "heavy hydrocarbons") may be removed by contacting the acid gases with a sponge oil comprising gas oil hydrocarbons. These latter normally have from 12 to 18 carbon atoms per molecule. Under such conditions the gasoline hydrocarbons are stripped from the acid gases and the "dry" acid gases then exit for storage or further use, such as in a sulfur-producing plant (e.g., a Claus sulfur plant) wherein essentially pure hydrogen sulfide is oxidized to an extent sufficient to form sulfur dioxide in proportions necessary to react with hydrogen sulfide and produce elementary sulfur and water. Such combinations may be effected in the presence of catalysts according to known procedures.

Contacting of the acid gases with the sponge oil may be effected in a top section of the stripping tower or in a separate scrubber tower preferably at a temperature of 80–150° F.

The fat sponge oil, containing extracted gasoline hydrocarbons is warmed, such as by indirect heat exchange with lean sponge oil being recycled to the sponge oil scrubbing tower. In the sponge oil stripping section the fat sponge oil may be heated still further, such as by means of a steam coil at the bottom of the stripper, to a temperature in the order of 300–400° F. for the purpose of evolving gasoline hydrocarbons. The pressure is such that at this bottom tower temperature the gasoline hydrocarbons are readily volatilized, pressures of about 25 p.s.i.a. or less being preferred. The volatilized gasoline hydrocarbons may be utilized as such or further purified if necessary by passing to a gasoline hydrocarbon purifier tower wherein they are volatilized and passed through a cooling zone where the gasoline hydrocarbons condense and exit from the bottom of the purifier while any residual acid gases pass to the acid gas collection line.

Referring now to FIGURE 1, in a specific case of treatment, a sour refinery gas containing 8% $H_2S$, 2% $CO_2$, the remainder being light hydrocarbons and inert gases was utilized for treatment according to the process of the invention. The sour feed from a source 1 is injected into the lower section of a rectified absorber 2, fitted with a reboiler not shown and fractionation plates not shown under a pressure of about 250 pounds p.s.i.a., the temperature of the feed being about 90° F. The bottom of the absorption tower is at a temperature of about 150° F., maintained by the reboiler, not shown, while the top section of the absorber has a temperature of about 100° F. The lean mixed solvent, comprising 20% diethanolamine and 80% by weight of dimethyl formamide enters the absorber 2 at a temperature of about 90° F. Hydrogen sulfide, any water and a small amount of hydrocarbons are absorbed by the absorbent solution from the sour feed. Dry sweet hydrocarbon gas leaves the absorption section of the absorber tower by means of line 11.

The fat absorbent containing absorbed acid gases leaves the bottom of the absorber column 2 and passes under substantially reduced pressure to the stripper column 13 which is heated by means of reboiler 14. If necessary, the acid gases being removed by heating in stripper 13 may be passed through a sponge oil section 15 wherein lean sponge oil from a source 6 is passed into a sponge oil section 15 and strips any remaining contaminating gasoline type hydrocarbons from the acid gas, the latter then passing to a storage area by means of line 16.

In one aspect of this invention, the process is found to be especially beneficial in the reduced demands of absorbent liquid throughput for the absorption of a given amount of acid gases as compared with absorption of a similar amount of acid gas by means of an aqueous alkanol amine solution. One of the further important benefits of the use of the mixed absorption solvent of this invention compared with aqueous amine absorbents lies in the small heat capacity of the amide-alkanol amine combined solvent compared with aqueous amine. For example, the heat capacity of a mixture of 20% diethanol amine and 80% dimethyl formamide is only about half of that of an aqueous diethanol amine solution. Moreover, the heat of desorption of $H_2S$ in the mixed solvent is somewhat lower and $H_2S$ stripping is easier at the higher temperatures employed in the mixed solvent process of this invention. As a result, the process heat load is lower and the cooling water requirements much lower in using the mixed solvent of the invention at a given volumetric solvent flow than for the corresponding aqueous amine prior art process.

In one aspect of this invention, the hydrogen sulfide extracted from a sour feed by the subject process is to be utilized for the preparation of elemental sulfur. This may be done by the Claus sulfur process or may be effected by injection of sulfur dioxide into the absorption tower. According to the latter process, the sour gas is fed into the absorption tower for contact with the mixed absorption solvent. At the same time sulfur dioxide is injected into the column and reacts with hydrogen sulfide absorbed in the mixed solvent from the sour gas feed. This forms elemental sulfur in a form of a heavy rapidly settling precipitate, thus contrasted to the very finely divided milky precipitate obtained in aqueous alkanol amine media. The unabsorbed sweet gases pass out of the absorption section where they may be preferably scrubbed with a lean amide-alkanol amine solution for the removal of any excess sulfur dioxide which may have remained in the unabsorbed stream as it passes from the absorption section. Preferably, the scrubbed dry sweet gas then passes through a sponge oil section for the purpose of removing any gasoline hydrocarbons which may be present.

The absorption medium, now containing suspended elemental sulfur, is conducted to a sulfur settler where sulfur settles to the bottom and the mixed absorption fluid, containing water of reaction, is heated sufficiently to volatilize water while the regenerated lean absorption mixture is then recycled to the absorption column for treatment of further quantities of sour gas. The volatilized water is removed from the settler. The sulfur dioxide added to the absorber in this version of the process of the invention may come from an extraneous source or may be obtained by oxidation of part of the sulfur with oxygen by known means to form $SO_2$.

The advantage of using a mixed solvent according to this invention as compared with the use of the amide as the sole extraction solvent or with aqueous alkanolamine solutions is indicated by the following comparative data. In the table below, it will be seen that at high partial pressures of hydrogen sulfide the solubility of $H_2S$ is extremely high in dimethyl formamide as a sole solvent but that it is essentially the same in a mixture of 20% diethanol amine–80% dimethyl formamide solution, while in a 20% aqueous diethanol amine solution the absorption of $H_2S$ is extremely low in comparison. However, at the lowest tested partial pressure of $H_2S$ (0.1 p.s.i.a.), the solubility of $H_2S$ in unmodified dimethyl formamide is extremely low. This indicates that as an acid gas is stripped by countercurrent contacting with an absorption solvent the effluent gas will probably contain appreciable amounts of residual $H_2S$. The data indicate that the use of aqueous diethanol amine at these low partial pressures of $H_2S$ would result in a high solubility of the latter. However, as stated above, the aqueous solutions are totally inadequate at higher pressures which would be encountered initially in stripping a very sour gas stream. Consequently, the intermediate and substantial solubility of $H_2S$ in the diethanol amine-dimethyl formamide mixture of the invention solves the problem desired, namely, high initial solubility at high partial pressures of $H_2S$ and satisfactorily sufficient solubilities of the latter at low partial pressures of H₂S.

Table A

| Partial Pressure of H₂S in feed, p.s.i.a. | Solubility in ml. STP H₂S/ml. Solvent | | |
|---|---|---|---|
| | Dimethyl Formamide | 20% Diethanolamine, 80% Dimethyl Formamide | 20% Diethanolamine, 80% Water |
| 300 | 3,860 | 3,900 | 84 |
| 100 | 238 | 250 | 58 |
| 10 | 25.5 | 50.6 | 42 |
| 1 | 2.2 | 11.2 | 20 |
| .1 | 0.2 | 2.8 | 7.6 |

In the figures, "DMF" refers to dimethyl formamide, and "DEA" refers to diethanolamine.

We claim as our invention:

1. The process of separating acidic gas from gaseous mixtures wherein the partial pressure of the acidic gas in the feed is initially at least 10 pounds p.s.i.a. which comprises effecting contact of the mixture with a liquid absorbent comprising 7.5–70% by weight of an amine having a p$K_b$ at 25° C. of 3–14 and 30–92.5% by weight of a selective solvent comprising an aliphatic acid amide.

2. The process of separating acidic gas from gaseous mixtures wherein the partial pressure of the acidic gas in the feed is initially at least 10 pounds p.s.i.a. which comprises effecting contact of the mixture with a liquid absorbent comprising 7.5–70% by weight of an alkanolamine and 30–92.5% by weight of a dialkyl N-substituted aliphatic acid amide and thereafter regenerating the absorbent.

3. The process of removing hydrogen sulfide from admixture with normally gaseous hydrocarbons wherein the partial pressure of hydrogen sulfide in the feed is initially at least 10 pounds p.s.i.a. which comprises contacting the admixture with a liquid absorbent comprising 10–30% by weight of diethanolamine and 90–70% by weight of dimethyl formamide under a pressure of 150–500 p.s.i.a. at a temperature between about 80° F. and about 350° F., separating gaseous hydrocarbons substantially free from hydrogen sulfide from the absorbent phase, heating the absorbent phase to strip hydrogen sulfide therefrom and recycling the absorbent phase for extracting hydrogen sulfide from further quantities of the admixture.

4. The process for fractionating a gaseous mixture comprising hydrogen sulfide, normally gaseous hydrocarbons and normally liquid gasoline component hydrocarbons and wherein the partial pressure of hydrogen sulfide in the feed is initially at least 10 pounds p.s.i.a. which comprises scrubbing the mixture with a liquid absorbent comprising 10–70% by weight of a alkanolamine and 30–90% by weight of a dialkyl N-substituted aliphatic acid amide whereby a gaseous phase relatively rich in hydrocarbons and substantially free of hydrogen sulfide is separated from the fat absorbent, scrubbing the gaseous phase with liquid $C_{12-18}$ hydrocarbon absorbent whereby a gaseous phase substantially free of normally liquid hydrocarbons is separated from the fat liquid $C_{12-18}$ hydrocarbons now containing absorbed gasoline hydrocarbons and separately heating the two absorbents to separately vaporize hydrogen sulfide and gasoline hydrocarbons and regenerate the lean absorbents.

5. A process according to claim 1 wherein the absorption is carried out in a rectified column, the temperature differential between the top and bottom of the column being between about 50 and about 150° F.

References Cited in the file of this patent
UNITED STATES PATENTS

| 2,161,663 | Baehr et al. | June 6, 1939 |
| 2,251,216 | Woodhouse | July 29, 1941 |
| 3,039,251 | Kamlet | June 19, 1962 |